(12) United States Patent
Field et al.

(10) Patent No.: US 7,935,404 B2
(45) Date of Patent: May 3, 2011

(54) SYSTEM AND METHOD FOR MARKING AN OPTICAL DISK

(75) Inventors: Marshall Field, Corvallis, OR (US); Andrew L. Van Brocklin, Corvallis, OR (US); Paul McClelland, Monmouth, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1759 days.

(21) Appl. No.: 11/047,152

(22) Filed: Jan. 31, 2005

(65) Prior Publication Data

US 2006/0171268 A1    Aug. 3, 2006

(51) Int. Cl.
    *B32B 3/02*    (2006.01)
(52) U.S. Cl. .................. 428/64.1; 428/64.4; 430/270.12
(58) Field of Classification Search .......................... None
    See application file for complete search history.

(56) References Cited

U.S. PATENT DOCUMENTS

| | | | |
|---|---|---|---|
| 3,199,999 A | 8/1965 | Greening | |
| 3,616,279 A | 10/1971 | Kendall | |
| 4,514,055 A * | 4/1985 | Grant | 359/210 |
| 4,702,979 A | 10/1987 | Otomura et al. | |
| 4,842,381 A * | 6/1989 | Green | 359/269 |
| 5,055,380 A * | 10/1991 | Bertucci et al. | 430/346 |
| 5,514,504 A * | 5/1996 | Iijima et al. | 430/20 |
| 5,518,325 A | 5/1996 | Kahle | |
| 6,060,220 A * | 5/2000 | Snortland | 430/320 |
| 6,077,582 A * | 6/2000 | Yoshimura et al. | 428/64.1 |
| 6,511,731 B2 | 1/2003 | Clark | |
| 6,767,148 B2 | 7/2004 | Murata | |
| 7,351,460 B2 * | 4/2008 | Kojima et al. | 428/64.4 |
| 7,436,754 B2 * | 10/2008 | Kojima et al. | 369/126 |
| 2003/0108708 A1 | 6/2003 | Anderson et al. | |
| 2003/0179679 A1 | 9/2003 | Morishima | |

FOREIGN PATENT DOCUMENTS

| | | |
|---|---|---|
| JP | 59-079443 A | 9/1984 |
| SU | 588525 A | 1/1978 |
| WO | WO 90/16057 A | 12/1990 |
| WO | WO 2004/109664 A | 12/2004 |

* cited by examiner

*Primary Examiner* — Elizabeth Mulvaney (57) ABSTRACT

A method for selectively marking a surface of an optical disk includes providing an optical disk, wherein the optical disk includes a metal, an electrolyte disposed on the metal, and a photoconductor disposed on the electrolyte, applying a voltage to the optical disk, the voltage being associated with a desired anodization color, and selectively applying a laser to the photoconductor to initiate anodization of the metal.

23 Claims, 9 Drawing Sheets

Titanium
26g Ti

10 V

55 V

15 V

60 V

20 V

65 V

25 V

70 V

30 V

75 V

35 V

80 V

40 V

85 V

45 V

90 V (breakdown)

SYSTEM AND METHOD FOR MARKING AN OPTICAL DISK

BACKGROUND

Optical discs have fast become an industry standard for data storage in the fields of computers, video, and music. Optical discs include, but are not limited to, compact discs (CDs), digital video (or versatile) discs (DVDs), and game system discs in a variety of formats. Commercially produced optical discs typically have digital data recorded on one side of the disc and a visual display, or a label printed or formed on the other side of the disc.

Some optical discs have been created that can store data on both sides of the disc. However, in many cases it is desirable to limit the optical disc data to a single side of the disc, leaving the other side of the disc for printed text, patterns, or graphics. The printed labeling on a non-data side of an optical disc can include images such as a decorative design, text identifying the data stored on the disc, or both.

As optical technology has advanced, writeable and re-writable optical discs, as well as equipment for writing data onto the discs, have become reasonably priced and within the grasp of ordinary consumers. Thus, many consumers currently have the ability to burn data onto optical discs with home or office computers that have optical disc drives. For example, consumers may, in some instances, purchase CD or DVD data from a website on the Internet and burn the data onto their own CD or DVD. Many such consumers also then desire the capacity to print or form a label on the other side of the disc as a professionally produced disc would have.

SUMMARY

An exemplary markable optical disk includes a metal, an electrolyte associated with the metal, a photoconductor disposed on top of the electrolyte, and a transparent conductor disposed on top of the photoconductor.

Additionally, an exemplary method for selectively marking a surface of an optical disk includes generating a desired image, converting the desired image into image forming commands, applying voltages to an optical disk associated with the image forming commands, and selectively applying a laser to a photoconductor where the voltages correspond to a desired image.

Moreover, according to one exemplary embodiment, an apparatus for selectively marking an optical disk includes a variable power supply, a conductor associated with the variable power supply, the conductor being configured to transmit power to an optical disk, an optical pickup unit including a laser, and a processor communicatively coupled to the optical pickup unit and the variable power supply, wherein the processor includes firmware configured to direct the formation of desired images on an optical disk.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings illustrate various embodiments of the present system and method and are a part of the specification. The illustrated embodiments are merely examples of the present system and do not limit the scope thereof. The summary and other features and aspects of the present system and method will become further apparent upon reading the following detailed description and upon reference to the drawings in which.

Throughout the drawings, identical reference numbers designate similar, but not necessarily identical, elements.

DETAILED DESCRIPTION

The present specification discloses a system and a method for selectively marking a surface of an optical disk. More specifically, the present specification includes a system and a method for using in situ anodization of a valve metal to produce full-color labels and pictures on optical disks. Conventional laser drives are used to modulate the voltage and current applied to a substantially solid electrolyte in intimate contact with the valve metal layer. Specific exemplary compositions of the optical disk, as well as exemplary systems and methods for forming the above-mentioned full-color labels and pictures on optical disks will be discussed in further detail below.

As used in this specification and in the appended claims, the term "Valve Metal" is meant to be understood broadly as describing any electroactive metal and/or alloy that may be selectively anodized to generate a desired color. Specifically, the term "valve metal" is meant to include, but in no way be limited to, aluminium, tantalum, niobium, titanium, hafnium, zirconium, and alloys thereof, all of which form adherent, electrically insulating, metal-oxide films when exposed to a voltage in the presence of an electrolyte.

In the following specification, for purposes of explanation, numerous specific details are set forth in order to provide a thorough understanding of the present system and method for selectively marking a surface of an optical disk. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1A:
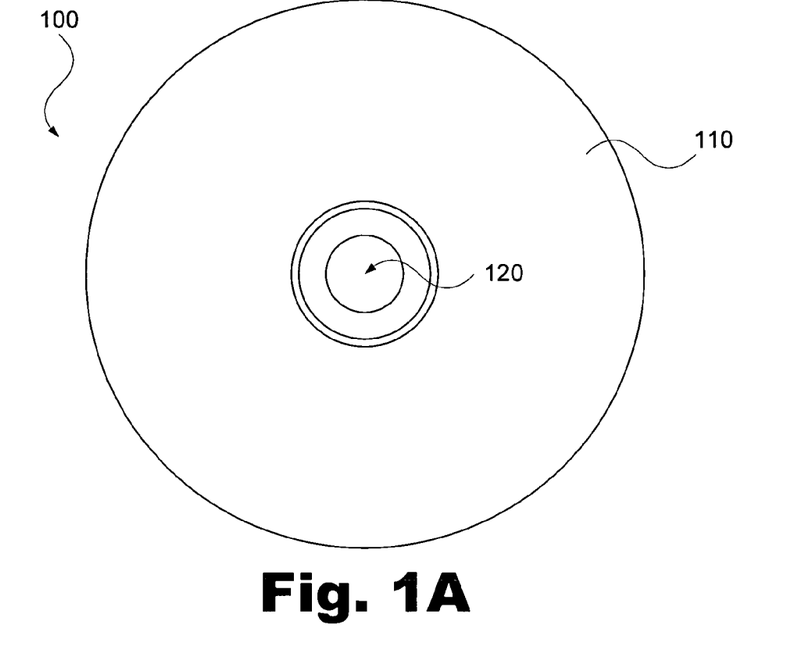
FIGS. 1A and 1B are perspective views of an optical disk, according to one exemplary embodiment.
Figure 1B:
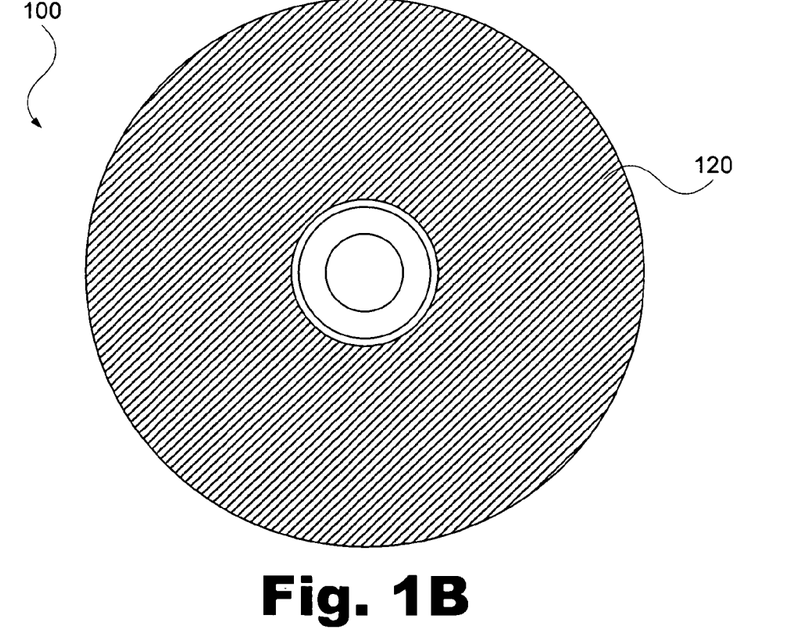

According to one exemplary system and method, FIGS. 1A and 1B illustrate opposing surfaces of an optical disk (100). As illustrated in FIG. 1A, an optical disk (100) includes a bottom data layer (110) and a center mounting orifice (120).

According to one exemplary embodiment, the bottom data layer (110) of the optical disk (100) includes a number of microscopic bumps (not shown) arranged as a single, continuous, and extremely long spiral track of data. These microscopic bumps are read by a laser and optical pickup unit (not shown) of an optical disk playing apparatus. According to the present exemplary embodiment, the optical disk (100) may include, but is in no way limited to, a digital video disk (DVD) or a compact disk (CD).

FIG. 1A also illustrates the center mounting orifice (120) of the exemplary optical disk (100). According to one exemplary embodiment, the center mounting orifice (120) is configured to be accessed by a rotatable spindle (not shown) of an optical disk player. The rotatable spindle is configured to rotate the optical disk to facilitate the reading of the data stored thereon with the optical pickup unit having a laser associated therewith.

As shown in FIG. 1B, the exemplary optical disk (100) also includes a top label surface (120). According to this exemplary embodiment, the top label surface (120) is configured to receive an image or design. More specifically, optical disks such as DVDs or CDs often receive a label on the top label surface (120). The label is often meant to provide aesthetic appeal and/or to provide information regarding the content contained on the bottom data layer (110; FIG. 1A). For example, the top label surface (120) often contains a label including a title to the movie or music contained thereon. According to the present exemplary embodiment, the present optical disk (100) is configure to have a desired picture and/or design formed thereon, as will be described in further detail below.

Figure 2:
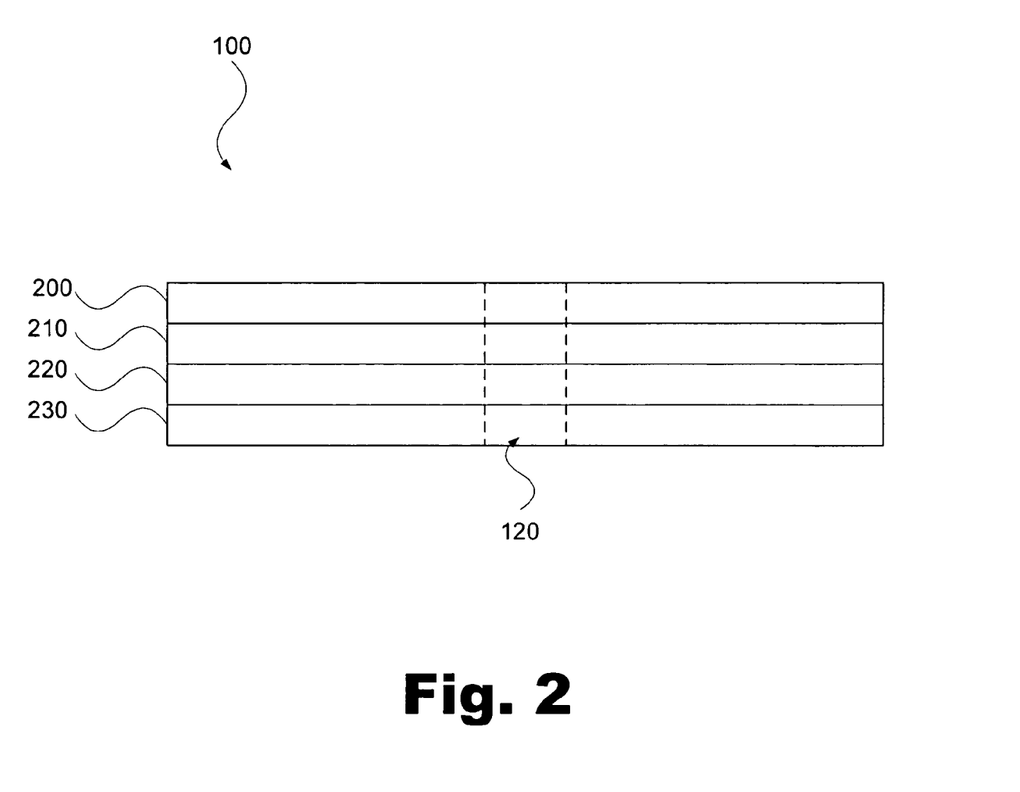
FIG. 2 is a cross-sectional view of a laser markable optical disk, according to one exemplary embodiment.

FIG. 2 illustrates a cross-sectional view of an optical disk (100), according to one exemplary embodiment. As illustrated in FIG. 2, the exemplary optical disk (100) includes a number of layers (200-230) that are traversed by the mounting orifice (120). As illustrated in FIG. 2, the number of layers (200-230) of the exemplary optical disk (100) includes at least, according to one exemplary embodiment, a transparent conductor (200), a photoconductor (210), an electrolyte (220), and a valve metal (230). The above-mentioned markable layers are extremely thin, resulting in a negligible increase in weight when compared to traditional optical disks. While the present optical disk composition is described in the context of the exemplary marking layers, additional layers may also be added to the optical disk (100), while incorporating the present exemplary embodiment including, but in no way limited to, a data carrying metallic layer comprising gold or aluminum, and/or a polycarbonate plastic coating. The exemplary marking layers (200-230) illustrated in FIG. 2 will now be described in further detail below.

According to the present exemplary embodiment, the first layer of the optical disk (100) is a transparent conductor (200). According to the present exemplary embodiment, the transparent conductor (200) is configured to carry a supplied charge to the photoconductor layer (210). The supplied charge may then be selectively applied through the photoconductor layer (210) to the electrolyte (220) and the valve metal layer (230). Additionally, the transparent conductor layer (200) of the present exemplary optical disk (100) is transparent to allow optical access to any image formed on subsequent layers.

According to one exemplary embodiment, the transparent conductor layer (200) of the present optical disk (100) may include, but is in no way limited to, Indium-Tin-Oxide (ITO). ITO may be used as the transparent conductor layer (200) having varying resistive characteristics depending on the deposition parameters and the starting compositions of the various depositions. According to one exemplary embodiment, the transparent conductor layer (200) of ITO may be deposited by electron-beam evaporation, sputtering, roll, or web coating methods.

As illustrated in FIG. 2, a photoconductor layer (210) is disposed adjacent to the transparent conductor (200). According to the present exemplary embodiment the photoconductor may be any substantially transparent material whose electrical resistance decreases with increasing incident light intensity.

Figure 3:
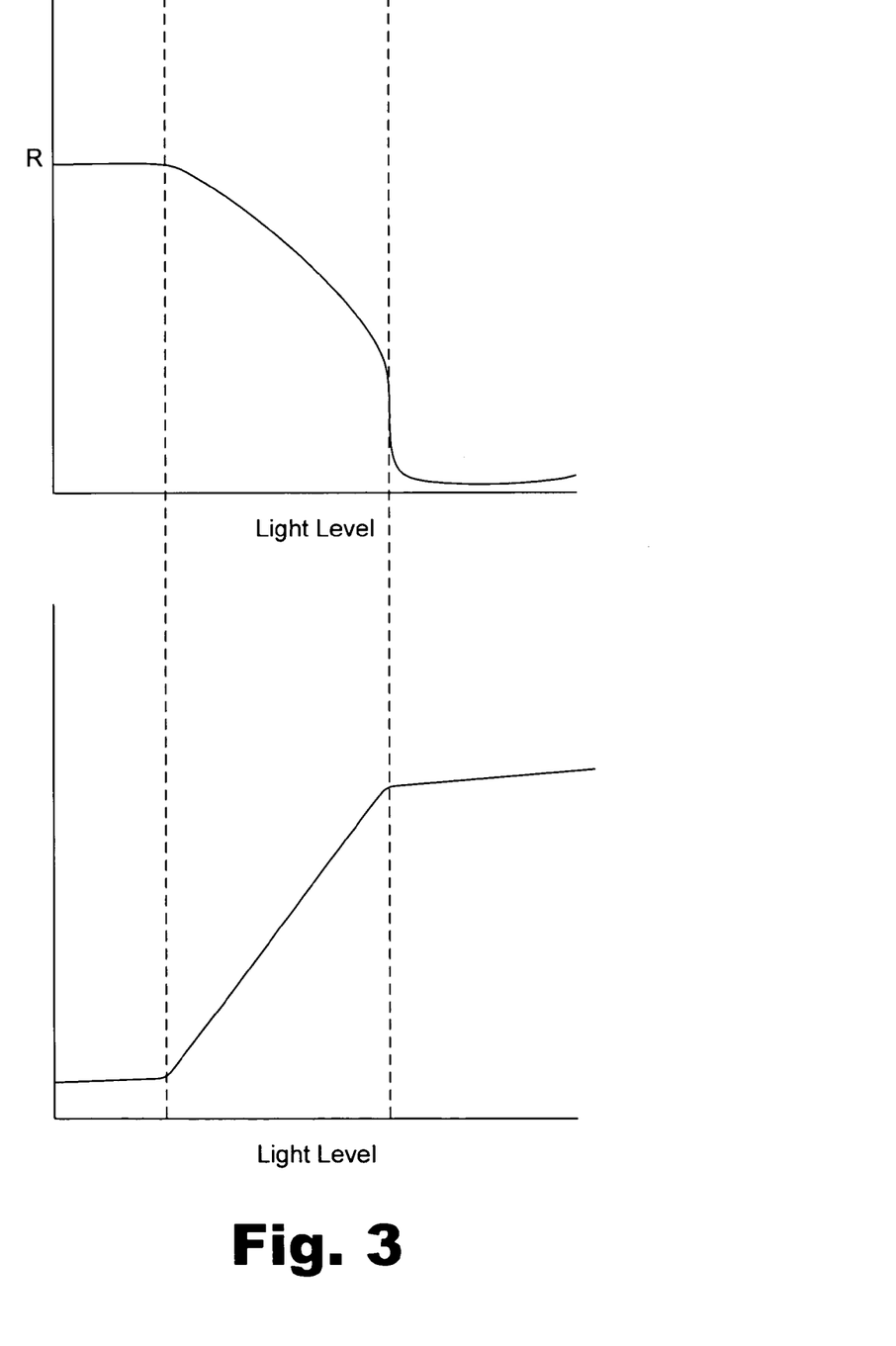
FIG. 3 is a schematic view illustrating the properties of a photoconductor, according to one exemplary embodiment.

FIG. 3 further illustrates the characteristics of a photoconductor (210) when exposed to various light intensities. As illustrated in FIG. 3, the resistance offered by the photoconductor layer (210) is relatively high when exposed to a relatively low light level. Correspondingly, the electrical current that may pass through the photoconductor layer (210) when exposed to low light levels is low. In contrast, as the photoconductor layer (210) is exposed to higher light levels, as illustrated in FIG. 3, the resistance of the photoconductor layer (210) is reduced and the current that is allowed to pass through the exposed portion of the photoconductor layer (210) is increased to a saturation point where the resistance of the photoconductor (210) is negligible. According to one exemplary embodiment, the conductivity of a photoconductor layer (210) may be selectively and locally activated by illuminating selective areas of the photoconductor layer.

Returning again to FIG. 2, the photoconductor layer (210) may include, but is in no way limited to, high resistance semiconductors such as cadmium sulfide (CdS), cadmium selenide (CdSe), microcrystalline silicone, polyethylene-dioxythiophene (PEDOT), and the like. According to the present exemplary embodiment, the photoconductor layer (210) may act as a semiconductor switch, selectively activating conductivity in select areas.

As shown in FIG. 2, the photoconductor layer (210) is disposed adjacent to an electrolyte layer (220). According to the present exemplary embodiment, the electrolyte layer (220) is configured to dissociate free ions to produce an electrically conductive medium. More specifically, in the present exemplary embodiment, the electrolyte layer (220) is configured to aid in the localized withdrawal of electrons from the layer of valve metal (230) while providing oxygen to the valve metal layer (230) to form a desired colored oxide. According to one exemplary embodiment, the electrolyte layer (220) may include any number of substantially solid or gel electrolytes including, but in no way limited to, a sodium bicarbonate gel, lithium perchlorate, etc.

Continuing with FIG. 2, the last exemplary layer illustrated in FIG. 2 is a valve metal layer (230). As shown, the valve metal layer (230) is disposed adjacent to the above-mentioned electrolyte layer (220). During operation, the valve metal layer (230) acts as an anode in an electrochemical process. More specifically, the valve metal layer (230) readily gives up electrons based on the charge applied to the system to produce metal cations in the form of selective anodization. As mentioned previously, the valve metal layer (230) may include, but is in no way limited to, aluminium, tantalum, niobium, titanium, hafnium, zirconium, and alloys thereof, all of which form adherent, electrically insulating, metal-oxide films when exposed to a voltage in the presence of an electrolyte. The valve metal layer (230) may be formed on the exemplary optical disk (100) using any number of deposition methods including, but in no way limited to, sputtering or evaporative film stacking.

Figure 4:
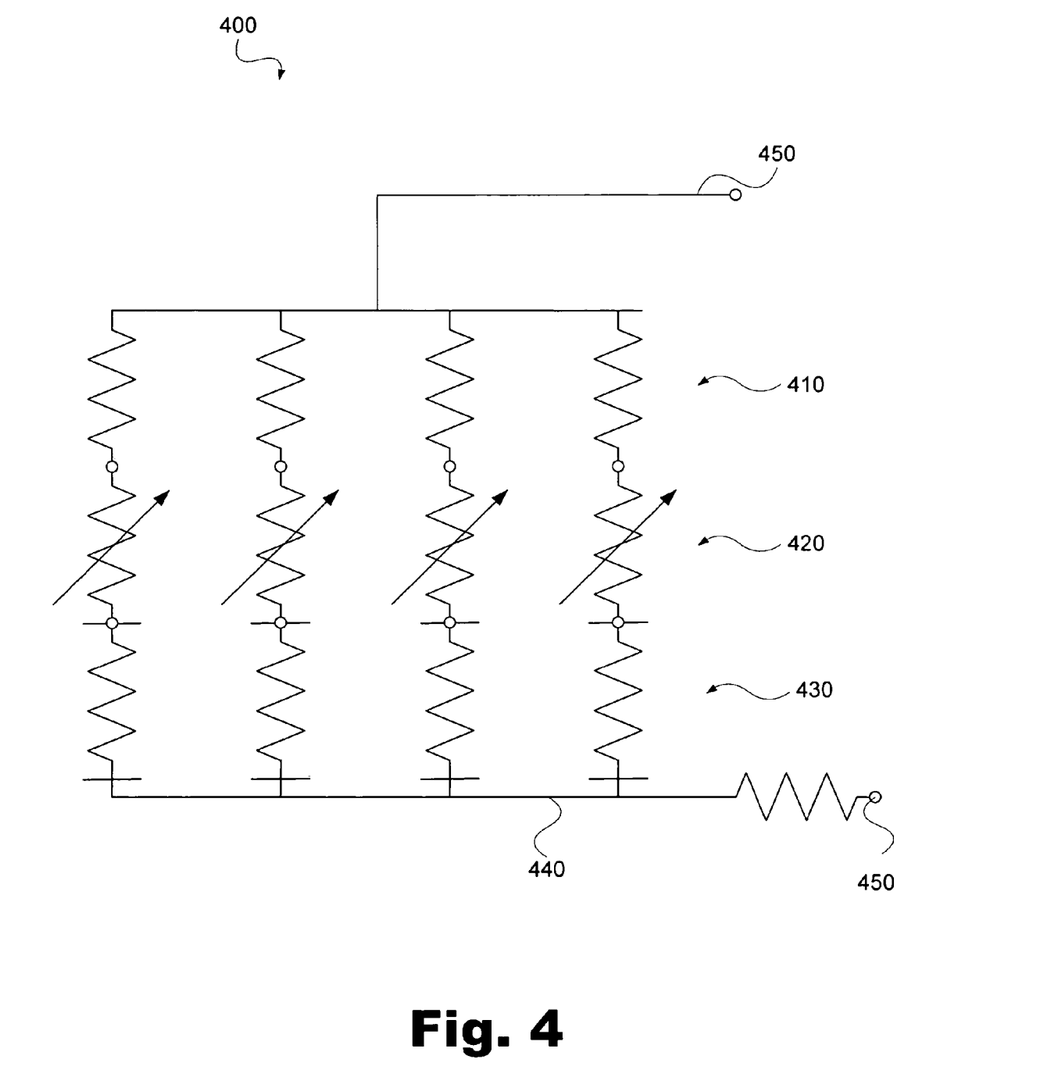
FIG. 4 is an electrical schematic illustrating the electrical properties of a laser markable optical disk, according to one exemplary embodiment.

As mentioned above, each of the various layers of the exemplary optical disk (100) exhibit electrical characteristics. FIG. 4 illustrates an electrical schematic (400) representing the electrical characteristics of the exemplary optical disk (100) having a cross-sectional composition similar to that described above with reference to FIG. 2. As illustrated in FIG. 4, the optical disk schematic (400) shows that if a power supply (450) were connected to opposing layers, an electrical circuit could be formed. Specifically, the transparent conductor layer (410) acts as a resistive layer conducting any charge applied thereto. In contrast to the transparent conductor layer (410), the photoconductor layer (420) acts as a number of electrical switches. According to this exemplary embodiment, the photoconductor layer (420) acts as a closed switch when not exposed to a light sufficiently intense and of the correct wavelength to activate the conductive properties of the material. However, when a sufficiently intense light is applied to one or more localized location on the photoconductor layer (420), the "switches" are activated causing the photoconductive material to conduct any applied charge in the localized exposed material. Continuing down the optical disk schematic (400), the electrolyte layer (430) is represented as a number of resistors configured to conduct any applied voltage and the valve metal layer (440) is simply illustrated as a conductor.

Figure 5:
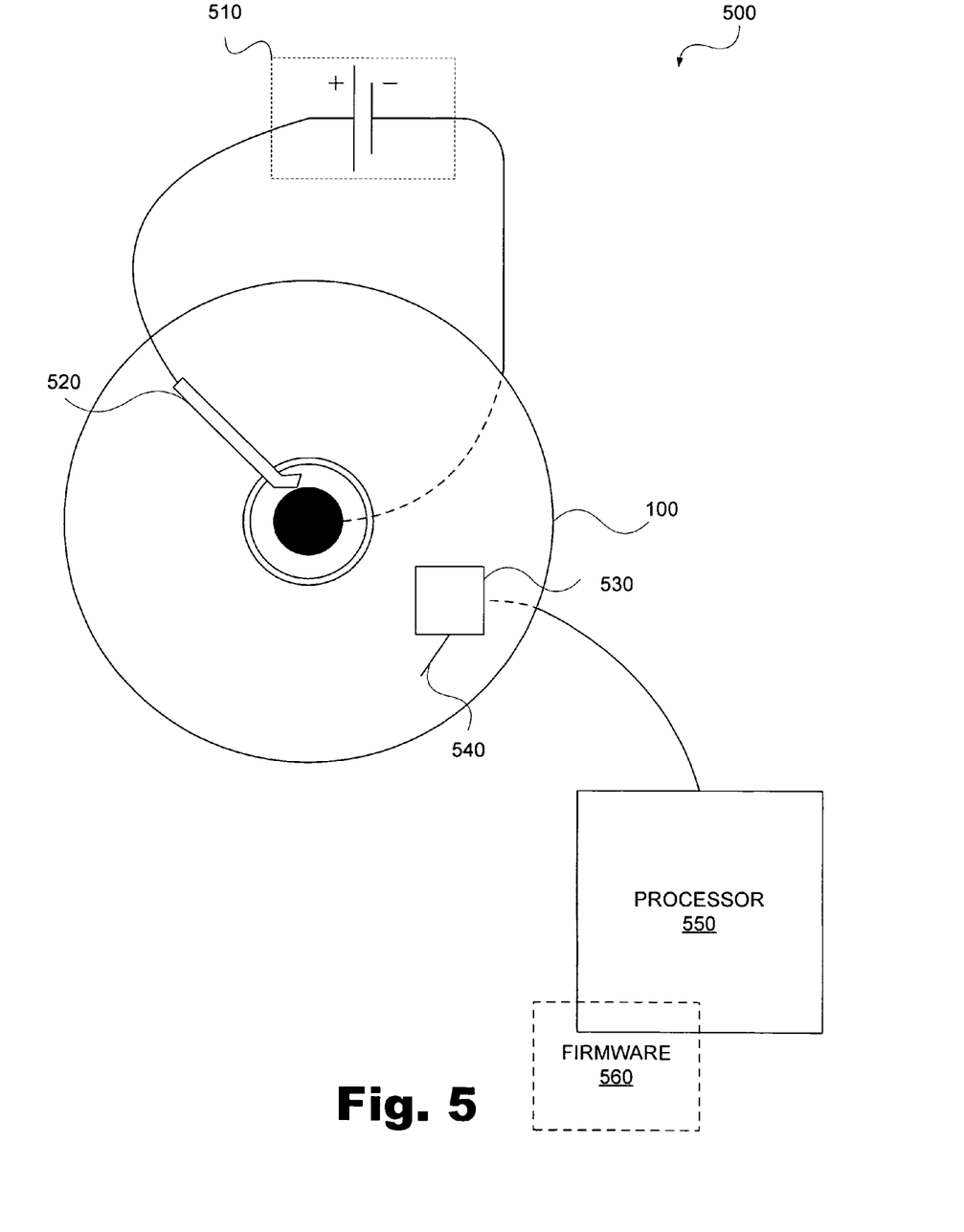
FIG. 5 is a schematic view illustrating a system for marking a laser marking optical disk, according to one exemplary embodiment.

Incorporating an optical disk as illustrated in FIG. 2, an exemplary optical disk writing system may be developed as illustrated in FIG. 5. As illustrated in FIG. 5, an exemplary optical disk writing system (500) may include an optical pickup unit (530) coupled to a laser (540). As illustrated in FIG. 5, the optical pickup unit (530) and the coupled laser (540) are communicatively coupled to a processor (550) having firmware (560) associated therewith. Additionally, the present exemplary optical disk writing system (500) includes a variable power supply (510) coupled to a slip ring (520). As shown, the slip ring (520) is configured to contact at least one surface of the optical disk (100) having images formed thereon. Further details of the components of the exemplary optical disk writing system (500) will be given below.

As illustrated in FIG. 5, the variable power supply (510) and the slip ring (520) are configured to selectively supply a desired voltage to the exemplary optical disk (100). According to one exemplary embodiment, the variable power supply (510) may be any system or apparatus configured to vary the magnitude of an electrical signal in response to a control signal. Further, as illustrated in FIG. 5, the variable power supply (510) is controllably coupled to the processor (550) having firmware (560) associated therewith. According to this exemplary embodiment, the voltage output from the variable power supply (510) to the slip ring (520) may be selected via control signals issued by the processor (550).

Additionally, the slip ring (520) component of the exemplary optical disk writing system may include a flexible, electrical connection having one or more electrical contacts disposed between the variable power supply (510) and the rotatable optical disk (100). According to one exemplary embodiment, the slip ring (520) is configured to maintain an electrical connection with the surface of the optical disk (100) during its rotation. Alternatively, the slip ring may be replaced with a capacitive coupling apparatus.

A laser (540) and coupled optical pickup unit (530) are also illustrated in FIG. 5. As illustrated, a standard optical pickup unit (530) and associated laser (540), which collectively may form a laser pickup assembly, are communicatively coupled to the processor (550). According to this exemplary embodiment, the processor (550) may controllably orient the optical pickup unit (530) above precise locations on the optical disk (100) and illuminate the laser (540). While the present exemplary embodiment is described in the context of using a DVD or CD laser to activate the photoconductor layer, any number of light emitting sources may similarly be used to activate the photoconductor layer including, but in no way limited to, a light emitting diode or fiber optics.

As mentioned previously, both the optical pickup unit (530) and the variable power supply (510) are controllably coupled to the processor (550). According to one exemplary embodiment, the exemplary processor (550) is configured to access and execute the associated firmware (560) to control the operation of the optical disk writing system (500). According to one exemplary embodiment, the processor (550) includes, but is in no way limited to, a computer, a laptop, a workstation, a DVD player processor, a CD player processor, and the like.

According to one exemplary embodiment, the exemplary firmware (560) that is associated with the present processor (550) contains a number of machine executable commands stored on a memory device that may be accessed by the processor (550) to controllably operate the components of the optical disk writing system (500). An exemplary method that may be performed by a processor (550) accessing the firmware (560) is illustrated in FIG. 6 and discussed in further detail below.

Exemplary Implementation and Operation

Figure 6:
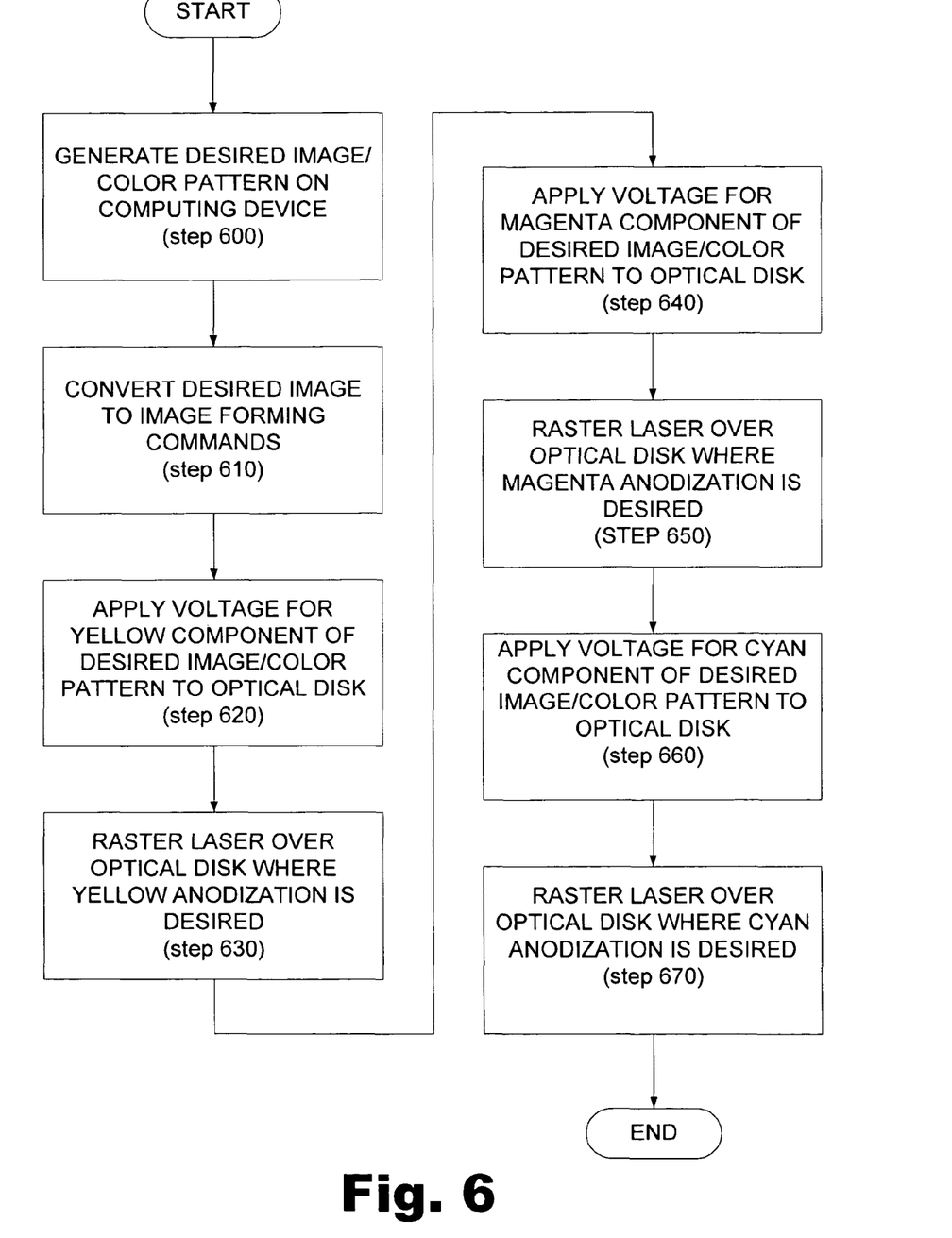
FIG. 6 is a flow chart illustrating a method for marking a laser marking optical disk, according to one exemplary embodiment.

Turning now to FIG. 6, a flowchart illustrates a method for selectively marking a surface of an optical disk, according to one exemplary embodiment. As illustrated in FIG. 6, the present exemplary method begins by first, generating a desired image or color pattern using a computing device (step 600). Once the desired image or color pattern is generated, the image or pattern is converted into a number of image forming commands or voltages associated with the desired image or color pattern (step 610). With the image forming commands generated, a voltage for the yellow component of the desired image or color pattern is applied to the optical disk (step 620). With the desired voltage applied to the optical disk, the optical pickup unit rasters its laser over the optical disk where yellow anodization is desired (step 630). Once the laser has completed its rasterization of the yellow component, a new voltage, corresponding to a magenta component of the desired image/color pattern is then applied to the optical disk (step 640). With the magenta voltage applied to the optical disk, the optical pickup unit rasters its laser over the optical disk where magenta anodization is desired (step 650). With the magenta component formed on the optical disk, a voltage corresponding to a cyan component of the desired image/color pattern is applied to the optical disk (step 660). The optical pickup unit then rasters its laser over the optical disk where cyan anodization is desired (step 670) to form the desired image/color pattern. Further details of the present exemplary method will be given below.

As mentioned above, the present exemplary method begins by first generating a desired image/color pattern on a computing device (step 600). According to one exemplary embodiment, the desired image/color pattern may be generated by any number of applications accessed by the processor (550; FIG. 5) of the computing device. Specifically, the desired image/color pattern may be generated using any number of illustrator type applications, or alternatively may be downloaded from the Internet. According to the present exemplary embodiment, the desired image or color pattern may include, but is in no way limited to, pictures, patterns, text, or any combination thereof.

Once the desired image or color pattern is generated or downloaded, the image or pattern is converted into a number of image forming commands or voltages associated with the desired image or color pattern (step 610). More specifically, according to one exemplary embodiment, the desired image or color pattern that has been generated is converted into a spiral track of voltages that correspond to the desired colors. According to this exemplary embodiment, the desired image or color pattern is first converted into a spiral track of colored bits. The colored bits corresponding to the desired image or color pattern are then converted into voltages associated with producing the colored bits on a markable optical disk (100; FIG. 1). According to one exemplary embodiment, converting the colored bits into associated voltages may include combining voltages for a plurality of base color voltages. According to one embodiment, the base color voltages may correspond to a yellow color voltage, a magenta color voltage, and a cyan base color voltage. In this manner, the colored bits may be represented by a CYM color scheme. Alternatively, any number of base colors and associated voltages may be used to construct the commands for forming the desired color bits, such as a red color voltage, green color voltage, and blue color voltage combination to follow a RGB color scheme; or a cyan base color voltage, a yellow color voltage, a magenta color voltage, and a black, brown, or approximately indigo color voltage to follow a CYMK color scheme. Alternatively, a color scheme incorporating eight or more different colors may be implemented. In yet another alternative embodiment, each color may be represented independently by a voltage based on a sliding scale of voltages that produce varying colors and hues. According to this exemplary embodiment, the voltage applied to the optical disk is rapidly varied as the laser progresses to produce the desired independent color at each pixel.

In another exemplary embodiment, the desired image and/or color pattern may be rasterized by producing a data file of voltages and/or commands representing a generally rectangular grid of pixels, or points of color. The color of each pixel is individually defined. According to one exemplary embodiment, each pixel is defined by three bytes—one for each base color as described above.

Once the desired image or pattern has been converted into a number of image forming commands (step 610), the commands may be used to form the desired image or pattern on the markable optical disk. According to the present exemplary embodiment, the image is formed by applying a first voltage to the optical disk that corresponds to the yellow component of the desred image/color patern (step 620). According to this exemplalry embodiment, the variable power supply (510; FIG. 5) is commanded by the processor (550; FIG. 5) to produce the voltage that corresponds to an anodization that results in a yellow color. Once the voltage is produced by the variable power supply (510; FIG. 5), it is applied to the transparent conductor layer (200; FIG. 2) of the optical disk (100; FIG. 5) by the slip ring (520) or other similar device. However, as discussed previously, the the voltage applied to the transpartent conductor layer (200; FIG. 2) is not transferred to the electrolyte layer (220; FIG. 2) or the valve metal layer (230; FIG. 2) due to the photoconductor layer (210; FIG. 2).

Figure 7:
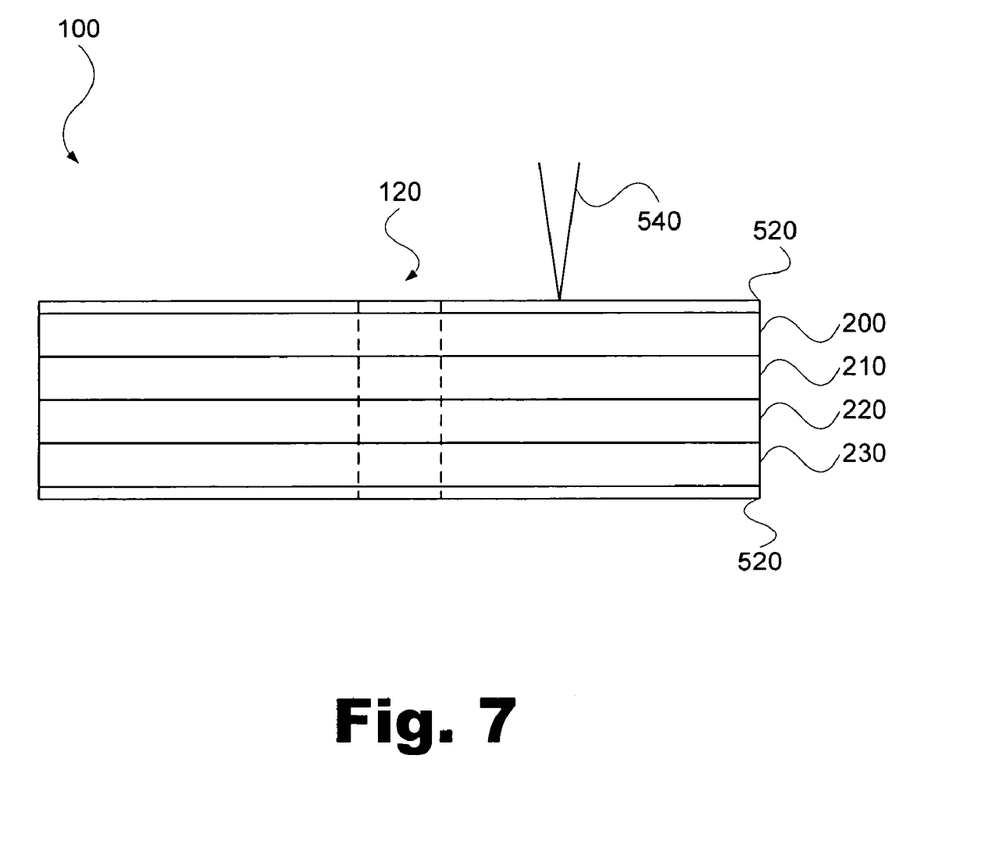
FIG. 7 is a cross-sectional view illustrating the marking of a laser marking optical disk, according to one exemplary embodiment.

In order to apply the produced voltage that is associated with yellow anodization, the laser component (540; FIG. 5) of the optical pickup unit (530; FIG. 5) is selectively passed over the locations of the optical disk where yellow anodization is desired (step 630), as illustrated in FIG. 7. Particularly, according to one exemplary embodiment, the image forming commands associated with the desired image are accessed and each command to produce a yellow bit in the spiral track of colored bits is read and converted into a localized application of the laser (540; FIG. 7) onto the surface of the optical disk (100; FIG. 7). As the laser is applied to each location yellow anodization is desired, the photo conductor layer (210; FIG. 7) of the markable optical disk (100; FIG. 7) is activated in the localized area. Consequently, the photo conductor layer (210; FIG. 7) conducts the applied voltage from the transparent conductor layer (200; FIG. 7) and it continues on to the electrolyte layer (220; FIG. 7) and the valve metal layer (230; FIG. 7) to produce the desired yellow anodization on the surface of the valve metal layer.

Once the optical pickup unit (530; FIG. 5) has applied the laser (540; FIG. 7) to the locations where yellow anodization is desired, a new voltage associated with a magenta components of the desired image/color pattern is applied to the optical disk (step 640). As mentioned above, mere application of the voltage associated with magenta anodization does not initiate anodization on the surface of the markable optical disk (100; FIG. 7). Rather, the photo conductor layer (210; FIG. 7) of the markable optical disk (100; FIG. 7) must be selectively activated in the areas where magenta anodization is desired.

As illustrated in FIG. 6, the laser (540; FIG. 7) is rastered and applied to the surface of the optical disk where the image forming commands demonstrate that magenta anodization is desired (step 650). The laser (540; FIG. 7) activates the photo conductor layer (210; FIG. 7) and initiates the localized magenta anodization.

Once the magenta anodization has been performed, a new voltage associated with a cyan component of the desired image/color pattern is applied to the optical disk (100; FIG. 7) by the variable power supply (510; FIG. 7). Again the application of the desired voltage is prevented from initiating anodization by the photo conductor layer (210; FIG. 7).

In order to allow the desired cyan anodization to occur on the surface of the markable optical disk (100; FIG. 7), the laser (540; FIG. 7) is applied to the surface of the optical disk where the image forming commands demonstrate that cyan anodization is desired (step 670). The laser (540; FIG. 7) activates the photo conductor layer (210; FIG. 7) and initiates the localized cyan anodization.

According to one exemplary embodiment of the present system and method, white space between the various anodized pixels may be avoided due to the varying thicknesses of the oxidized colors produced with the present method. More specifically, the various color pixels produced through anodization increase in thickness with the application of an increased voltage. Consequently, the above-mentioned printing may be designed to slightly overlap the anodized pixels to avoid white space between the pixels. When the anodized pixels are overlapped, the overlapping area will assume the thickness and color of the pixel formed through an application of a higher voltage.

While the present method was described in the context of dividing the desired image/color pattern into three components associated with yellow, magenta, and cyan anodization, any color based division may occur. For example, according to one exemplary embodiment, the desired image/color pattern may be separated into red, green, and blue image components prior to initiating the localized anodization. Alternatively, the desired image/color pattern may be separated into cyan, yellow, magenta, and black or brown image components prior to initiating the localized anodization. In yet another exemplary embodiment, the voltage applied to the markable optical disk (100; FIG. 7) by the variable power supply (510; FIG. 7) may be rapidly varied as the laser passes over each colored bit, allowing a complete image/color pattern to be produced with a single spiral pass of the optical pickup unit (530) and associated laser (540) across the surface of the markable optical disk (100; FIG. 7).

Figure 8:
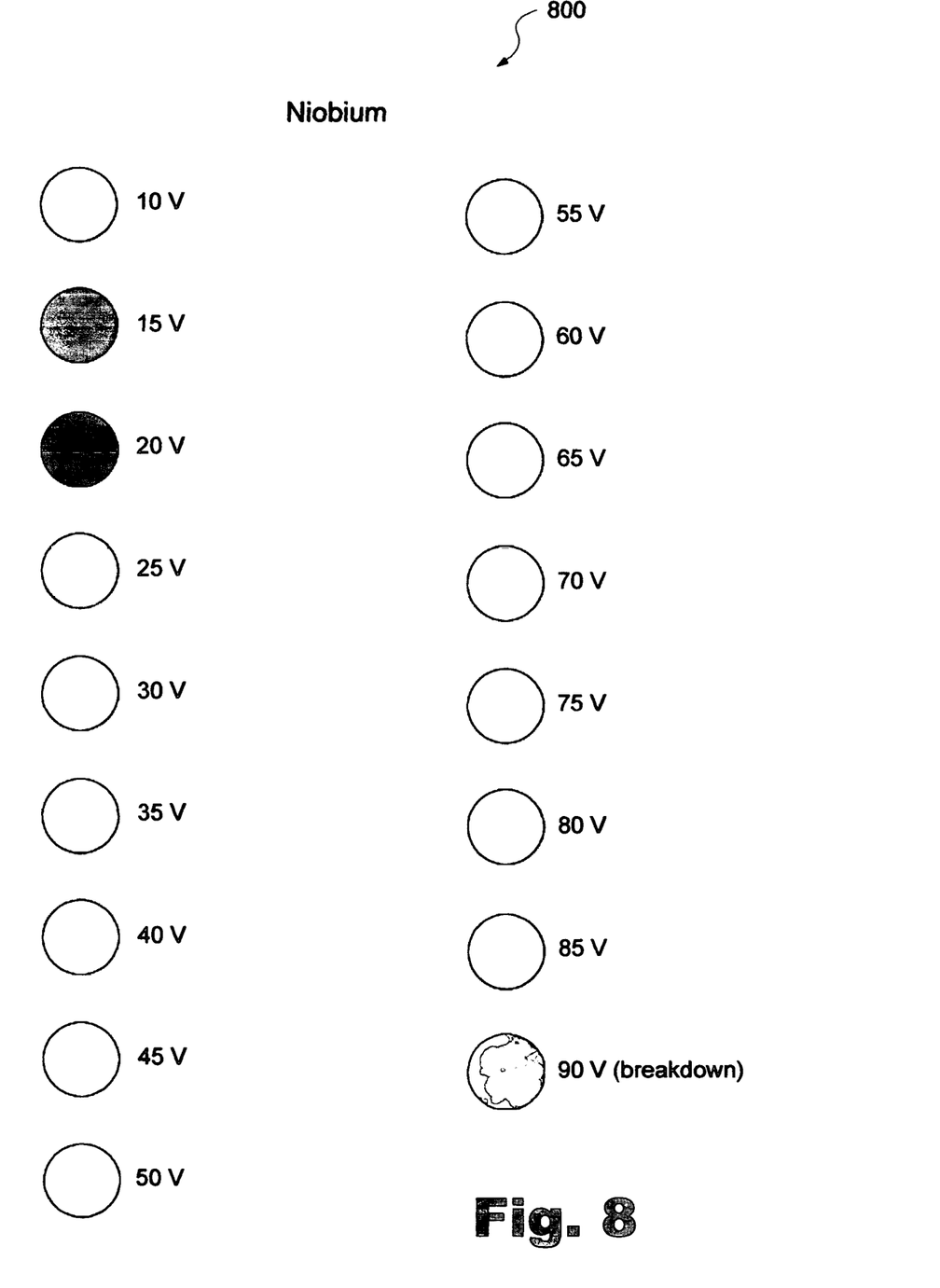
FIG. 8 is sample view illustrating the colors produced by an anodized sample of niobium, according to one exemplary embodiment.
Figure 9:
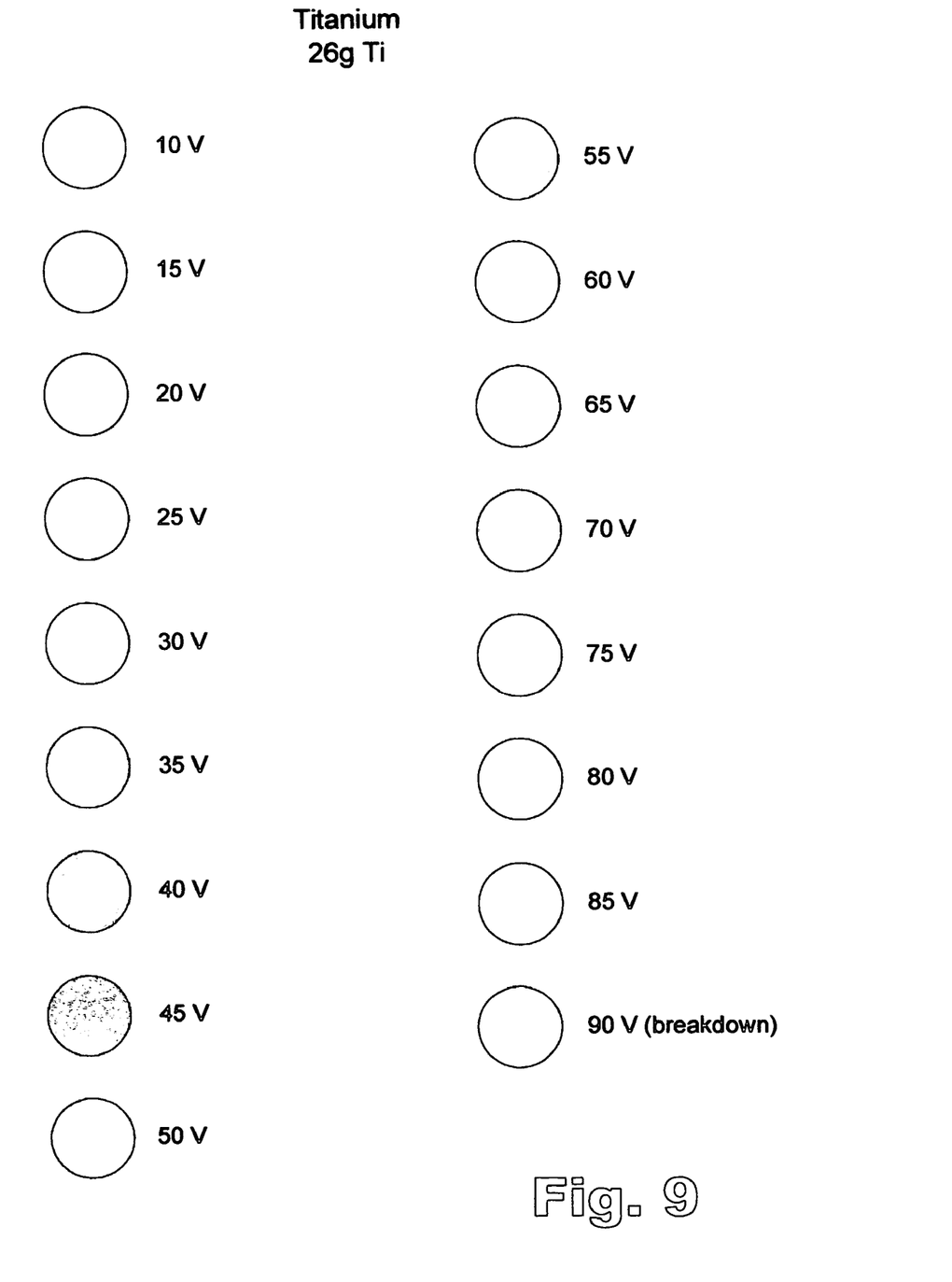
FIG. 9 is a sample view illustrating the colors produced by an anodized sample of titanium, according to one exemplary embodiment.

FIGS. 8 and 9 illustrate a number of color anodizations that were produced according to the present exemplary system and method. As illustrated in FIG. 8, a sample of niobium was exposed to anodization at various voltages between 10 and 90 volts. As illustrated, a wide spectrum of colors was produced on the niobium.

Similarly, FIG. 9 illustrates a number of color anodizations that were produced according to the present exemplary system and method on a sample of titanium. As illustrated in FIG. 9, the sample of titanium was also exposed to anodization at various voltages between 10 and 90 volts. Again, as illustrated, a wide spectrum of colors was produced on the titanium using the present exemplary system and method.

As can be further deduced from FIGS. 8 and 9, the color produced by the present exemplary marking method produces anodization colors that are directly linearly-dependent on the voltage level applied. This linear predictability may then be used in the image conversion process (step 610; FIG. 6) to accurately and repeatably produce a desired image/color pattern on a surface of the markable optical disk (100; FIG. 7). Additionally, the present exemplary system and method does not depend on percent or mixture of dyes or pigments when forming the desired image. Further, because an existing layer is anodized by the present system and method, rather than adding material to the surface of the optical disk, the present exemplary system and method will have little or no effect on balance of the optical disk.

In conclusion, the present method for marking a surface of an optical disk allows for the formation of full color images and/or color patterns using a standard optical disk laser. Further, the color images and/or color patterns are saturated, permanent inorganic oxides. Moreover, the present exemplary system and method does not depend on percent or mixture of dyes or pigments and has little or no effect on the resulting balance of the optical disk.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A method for selectively marking a surface of an optical disk comprising:
   providing an optical disk, wherein said optical disk includes a metal, an electrolyte disposed on said metal, and a photoconductor disposed on said electrolyte;
   applying a voltage to said optical disk, said voltage being associated with a desired anodization color; and
   selectively applying a laser to said photoconductor to initiate anodization of said metal.

2. The method of claim 1, wherein said applying a voltage to said optical disk further comprises:
   generating a desired image;
   converting said desired image into image forming commands; and
   generating a voltage in response to said image forming commands.

3. The method of claim 2, wherein said generating a desired image comprises one of forming a desired image on an illustration program or downloading said image.

4. The method of claim 2, wherein converting said desired image into image forming commands comprises:
   converting said desired image into a spiral track of colored bits; and
   converting said colored bits into commands to produce voltages corresponding to producing the colored bits on a said optical disk.

5. The method of claim 4, wherein converting said colored bits into commands further comprises representing each of said colored bits as a combination of base color voltages.

6. The method of claim 5, wherein said base color voltages comprise voltages associated with yellow anodization, magenta anodization, and cyan anodization.

7. The method of claim 5, wherein said base color voltages comprise red anodization, green anodization, and blue anodization.

8. The method of claim 4, wherein converting said colored bits into commands further comprises representing each of said colored bits as a single voltage.

9. The method of claim 8, wherein each of said single voltage bits is associated with a reproducible color.

10. The method of claim 1, wherein selectively applying a laser to said photoconductor to initiate anodization of said metal further comprises:
    selectively illuminating portions of said photoconductor immediately adjacent to a desired anodization location on said metal.

11. The method of claim 1, wherein said metal comprises a valve metal.

12. The method of claim 11, wherein said valve metal comprises one of an aluminum, a tantalum, a niobium, a titanium, a hafnium, or a zirconium.

13. The method of claim 1, wherein said metal comprises a valve metal alloy.

14. A markable optical disk comprising:
    a metal; and
    a means for selectively anodizing said metal;
    wherein said optical disk is configured to selectively anodize a surface of said metal in response to a voltage.

15. The markable optical disk of claim 14, wherein said metal comprises a valve metal.

16. The markable optical disk of claim 15, wherein said valve metal comprises one of an aluminum, a tantalum, a niobium, a titanium, a hathium, or a zirconium.

17. The markable optical disk of claim 15, wherein said valve metal comprises an alloy.

18. The markable optical disk of claim 14, wherein said metal is sputter deposited or evaporative film stacked on said disk.

19. The markable optical disk of claim 14, wherein said means for selectively anodizing said metal comprises an electrolyte disposed on said metal, and a photoconductor disposed on said electrolyte.

20. The markable optical disk of claim 14, further comprising a conductive means for transparently protecting said optical disk.

21. The markable disk of claim 20, wherein said conductive means for transparently protecting said optical disk comprises Indium-Tin-Oxide.

22. The method of claim 1, further comprising varying said voltage to correspond to, and to produce, different desired anodization colors by anodization of said metal.

23. The method of claim 1, in which selectively applying said laser comprises selectively applying laser to said photoconductor to initiate anodization of said metal to produce a desired visual image on a surface of said optical disk, said visual image being in color and resulting from said anodization of said metal, in which different voltages are selectively applied to produce different colors in said visual image through anodization of said metal.

* * * * *

UNITED STATES PATENT AND TRADEMARK OFFICE
CERTIFICATE OF CORRECTION

| | |
|---|---|
| PATENT NO. | : 7,935,404 B2 |
| APPLICATION NO. | : 11/047152 |
| DATED | : May 3, 2011 |
| INVENTOR(S) | : Marshall Field et al. |

It is certified that error appears in the above-identified patent and that said Letters Patent is hereby corrected as shown below:

In column 10, line 38, in Claim 16, delete "hathium" and insert -- hafnium --, therefor.

Signed and Sealed this
Eleventh Day of October, 2011

David J. Kappos
*Director of the United States Patent and Trademark Office*